United States Patent
Archenhold

(10) Patent No.: US 11,877,360 B2
(45) Date of Patent: Jan. 16, 2024

(54) ILLUMINATION CONTROL SYSTEM

(71) Applicant: Radiant Research Limited, Oldbury (GB)

(72) Inventor: Geoffrey Howard Gillett Archenhold, Sutton Coldfield (GB)

(73) Assignee: Radiant Research Limited, Oldbury (GB)

( * ) Notice: Subject to any disclaimer, the term of this patent is extended or adjusted under 35 U.S.C. 154(b) by 0 days.

(21) Appl. No.: 17/675,281

(22) Filed: Feb. 18, 2022

(65) Prior Publication Data

US 2022/0217820 A1 Jul. 7, 2022

Related U.S. Application Data

(63) Continuation of application No. PCT/GB2020/052015, filed on Aug. 21, 2020.

(30) Foreign Application Priority Data

Aug. 21, 2019 (GB) ...................................... 1912009

(51) Int. Cl.
    *H05B 45/14*    (2020.01)
    *H05B 45/375*   (2020.01)
    *H05B 45/32*    (2020.01)

(52) U.S. Cl.
    CPC ............. *H05B 45/14* (2020.01); *H05B 45/32* (2020.01); *H05B 45/375* (2020.01)

(58) Field of Classification Search
    CPC ...... H05B 45/14; H05B 45/32; H05B 45/375; H05B 45/3725; Y02B 20/30
    See application file for complete search history.

(56) References Cited

U.S. PATENT DOCUMENTS 10,015,858 B1 * 7/2018 Felty .................... H05B 45/385
10,251,231 B1 * 4/2019 DeJonge .............. H05B 47/155
(Continued)

FOREIGN PATENT DOCUMENTS

EP    2741584 A1    6/2014
WO    2011075531 A2    6/2011
(Continued)

OTHER PUBLICATIONS

Combined Search and Examination Report for GB Application No. 1912009.6, dated Jan. 28, 2020, 7 pages filed herewith.
(Continued)

*Primary Examiner* — Daniel D Chang
(74) *Attorney, Agent, or Firm* — Amundsen Davis, LLC

(57) ABSTRACT

A control system arranged to provide dimming control of light output of one or more light emitting device (124), the control system comprising: a switch mode regulator (91) arranged to provide an output power signal to the one or more light emitting device (124), and to vary the output power signal; one or more feedback sensors (304) arranged to measure characteristic parameters of the output power signal, the characteristic parameters comprising at least one of: current, voltage and power; and a controller arranged to: when a characteristic parameter of the output power signal is above a threshold (210), vary the output power signal in a closed control loop, based on feedback from the one or more feedback sensors (304); and when the characteristic parameter of the output power signal is below the threshold (210), vary the output power signal in an open control loop.

18 Claims, 3 Drawing Sheets

(56) References Cited

U.S. PATENT DOCUMENTS

2016/0323953 A1    11/2016  DeJonge
2017/0181238 A1*    6/2017  Ferrier ................. H05B 45/375

FOREIGN PATENT DOCUMENTS

WO         2011117770 A1    9/2011
WO         2019118270 A1    6/2019

OTHER PUBLICATIONS

Examination Report for GB Application No. 1912009.6, dated Nov. 25, 2021, 2 pages filed herewith.
Search Report & Written Opinion for PCT Application No. PCT/GB2020/052015, "Illumination Control System", dated Oct. 27, 2020, 14 pages filed herewith.
Texas Instruments, "AN-1656 Design Challenges of Switching LED Drivers", dated Oct. 2007 and revised May 2013, 7 pages filed herewith.
Texas Instruments, "LM3414/HV 1-A, 60-W Common Anode Capable Constant Current Buck LED Driver Requires No. External Current Sensing Resistor", dated Jun. 2010 and revised Nov. 2015, 34 pages filed herewith.
Wikipedia, "Buck Converter", dated Apr. 3, 2019, 15 pages filed herewith.

* cited by examiner

ILLUMINATION CONTROL SYSTEM

CROSS-REFERENCE TO RELATED APPLICATIONS

The present application is a continuation of PCT Application No. PCT/GB2020/052015, filed on Aug. 21, 2020 and titled ILLUMINATION CONTROL SYSTEM, which claims the benefit of GB Patent Application Serial No. 1912009.6 filed on Aug. 21, 2019.

TECHNICAL FIELD

The present invention relates to an illumination control system arranged to provide dimming control of light output, and a method of dimming lighting output.

In particular but not exclusively, the present invention relates to a method and control system for dimming or otherwise adjusting the brightness of or regulating the power to Solid State Light sources (SSLs) such as Light Emitting Diodes (LEDs), Organic Light Emitting Diodes (OLEDs), Solid-State Diode LASERs (SSDLs) and other Solid-State Light source loads based upon organic or inorganic light emission mechanisms. The present invention also relates to improvements in methods and systems to provide a means for data transfer using said light sources.

BACKGROUND

The use of SSLs such as LEDs, OLEDs SSDLs in lighting systems is well known as they offer significant advantages over traditional light sources such as higher efficacy, increased reliability due to their solid-state nature and increased longevity, amongst many other advantages known to those familiar in the area of LEDs, OLEDs and SSDLs.

LED, OLED and SSDL based lighting is used in a wide variety of configurations for general and specific illumination applications including, but not limited to automotive lighting, task lighting, accent lighting, emergency lighting, hospitality lighting, restaurant lighting, hospital lighting, office lighting, retail lighting, automotive lighting, street lighting, amenity lighting, effect lighting, marine lighting, display case lighting, TV, film and projection lighting, entertainment lighting, animal and food production lighting, medical lighting, outdoor lighting, backlighting of displays, irradiation of micro-organisms in fluids using UV, curing and setting in industrial processes, corridor lighting, security lighting and the like.

LEDs, OLEDs and SSDLs are current-controlled devices where the intensity of light emitted from the device is related to the amount of current driven through the device. It is therefore highly advantageous to carefully and reliably control the amount of current flowing through the LED, OLED or SSDL device(s) in order to achieve the desired illumination effect from an illumination system and to maximise the life of a device by ensuring the maximum current, voltage or power specifications are not exceeded. In addition it is well known that the switching or modulation speed of LED, OLED and SSDL devices is fast enough to enable their use as data transmitters in combination with the primary use of illumination.

LED, OLED and SSDL power supply systems have been developed based on a variety of circuit design topologies which provide the ability to vary the actual or time-averaged forward current through the light emitting device load over an acceptable range in order to provide dimming capabilities.

However, as solid-state light emitters have improved in efficiency even small amounts of current flowing through the device creates a significant amount of excitation photons. This creates the undesirable illumination appearance of large steps between dimming levels at low intensities (low dimming resolution) and a significant minimum light at the lowest dimming level.

LED, OLED and/or SSDL based illumination systems have been devised which, through the use of multiple light emitting devices having discrete wavelengths/colours, can produce a variety of colours and intensities. Systems incorporating Red, Green, Blue, Amber and White light emitters can create near infinite colour variations by varying the intensity, current or power of each of the coloured light emitter(s) individually or together in combination. The use of multiple discrete wavelengths in the illumination system provides the opportunity to increase data transfer rate from the light emitting devices by using different photon energies multiplexed simultaneously to increase system bandwidth.

Many advanced lighting systems require the ability to be dimmed, often using an external control system to provide dimming level information to the illumination system. The majority of the dimming methods employed use either constant current reduction (CCR) also known as DC dimming or a time averaged pulse modulated method such as Pulse Width Modulation (PWM), Pulse Amplitude Modulation (PAM), Pulse Frequency Modulation (PFM) and many others.

Current dimming methods cannot easily achieve high precision dimming over wide current ranges in a highly efficient manner. Dimming systems often include sharp steps in intensity or colour when systems are dimmed on and off, especially at low light illumination levels.

EP 2,477,459 discloses a hybrid power control system for providing dynamic power control to illumination systems in which a power source can supply any one of a range of AC or DC voltages. One or more switch mode power supplies incorporating one or more linear and switch mode regulator circuits combined to dynamically control current, voltage and power to the illumination system. The switch mode regulator is operated when the output current is in a first range, and inactive when the output current is in a second range, below the first range.

SUMMARY

According to a first aspect of the invention, there is provided a control system arranged to provide dimming control of light output of one or more light emitting device, the control system comprising: a switch mode regulator arranged to provide an output power signal to the one or more light emitting device, and to vary the output power signal; one or more feedback sensors arranged to measure characteristic parameters of the output power signal, the characteristic parameters comprising at least one of: current, voltage and power; and a controller arranged to: when a characteristic parameter of the output power signal is above a threshold, vary the output power signal in a closed control loop, based on feedback from the one or more feedback sensors; and when the characteristic parameter of the output power signal is below the threshold, vary the output power signal in an open control loop.

The output power signal may be a pulsed signal having a plurality of pulses.

When the characteristic parameter of the output power signal is below the threshold, the output power signal may be alternated between one or more periods in an on state and one or more periods in an off state. The one or more periods in the on state may include at least one pulse of the pulsed signal. the one or more periods in the off state may have a duration corresponding to at least one pulse of the pulsed signal.

Varying the output power signal in an open control loop may comprise varying the ratio of a total time in the off state to a total time in the on state, to vary the total number of pulses in a fixed duration of time comprising one or more periods in the on state and one or more periods in the off state.

The durations of the one or more periods in the on state may vary such that output signal follows an irregular pattern between the periods in the on state and the periods in the off state.

When the characteristic parameter of the output power signal is below the threshold, the output power signal may be variable between a plurality of discrete levels, each level having a corresponding pattern of one or more periods in the on state and one or more periods in the off state.

The system may comprise a memory arranged to store a look-up table to store the corresponding pattern for each discrete level of the output power signal.

The switch mode regulator may be operated in a continuous conduction mode during the one or more periods in the on state.

A duration of each pulse of the pulsed signal may be constant when the characteristic parameter of the output power signal is below the threshold.

The switch mode regulator may comprise a switching device operated at a switching frequency.

When the characteristic parameter of the output power signal is above the threshold, varying the output power signal in a closed control loop may comprise changing a switching frequency of the switch mode regulator to vary the pulse period.

The switch mode regulator may be operable in continuous conduction mode when the switching frequency is above a minimum stable switching frequency.

The threshold of the characteristic parameter of the output power signal may be determined such that the controller varies the output power signal in the closed control loop when the switching frequency is above the minimum stable switching frequency.

The switching device may be controlled by a pulsed output from the controller.

The controller may be further arranged to: when the characteristic parameter of the output power signal is above the threshold, modulate the voltage or current of the output to provide for transmission of data by the lighting output.

The controller may be further arranged to, on determining that the output power signal is to be increased from below the threshold to above the threshold: measure the characteristic parameter of the output power signal; compare the measured value to an expected value at the threshold, the expected value based on control data for controlling the system in an open control loop; and when determining that that the measured value is different to the expected value, control the switch mode regulator to increase the output power signal from the measured value, and modifying the control data based on the measured value.

The feedback sensor may comprise a current sensing resistor provided in series with the output channel to the one or more light emitting device.

The current sensing resistor may be floating with respect to a ground of the output channel.

According to a second aspect of the invention, there is provided a method of dimming lighting output, the method comprising: providing an output power signal for powering one or more light emitting devices; measuring characteristic parameters of the output power signal, the characteristic parameters comprising at least one of: current, voltage and power; when a characteristic parameter of the output power signal is above a threshold, varying the output power signal in a closed control loop, based on feedback from the one or more feedback sensors; and when the characteristic parameter of the output power signal is below the threshold, varying the output power signal in an open control loop.

The output power signal may be a pulsed signal, each pulse of the pulsed signal having a plurality of pulses.

When the characteristic parameter of the output power signal is below the threshold, the output power signal may be alternated between one or more periods in an on state and one or more periods in an off state. The one or more periods in the on state may include at least one pulse of the pulsed signal. The one or more periods in the off state may have a duration corresponding to at least one pulse of the pulsed signal.

The output power signal may be provided by a switch mode regulator.

The method may comprise: operating the switch mode regulator in a continuous conduction mode during the one or more periods in the on state, when the characteristic parameter of the output power signal is below the threshold and when varying the output power in the closed control loop.

The switch mode regulator may comprise a switching device operable in continuous conduction mode when the switching frequency is above a minimum stable switching frequency. The threshold of the characteristic parameter of the output power signal may be determined such that the output power signal in varied in the closed control loop when the switching frequency is above the minimum stable switching frequency.

According to a third aspect of the invention, there is provided a computer program that, when read by a computer, causes performance of the method of the first aspect.

According to a further aspect of the invention, there is provided a digital controlled power supply capable of controlling the power to a solid state lighting system that comprises one or more of the following: a power supply to convert an input power source to an output power source suitably configured for a digitally controlled switch mode controller; one or more digital switch mode controller(s) capable of independently modulating the power to a solid-state lighting module over a wide dynamic range. The one or more digital switch mode controller(s) may incorporate one or more of: a microprocessor containing one or more high resolution PWM outputs with a resolution of less than 1 nS and one or more high resolution analogue or digital conversion means; one or more feedback devices or sensors; a multiphase phase power, voltage or current modulation controller comprising at least one closed-loop phase using a PID controller that is capable of operating with one or more user demanded set points wherein the PID controller operates the switch mode controller in both Continuous Conduction Mode and Discontinuous Conduction Mode for precision power control and/or the PID controller provides precision current and/or voltage regulation to enable Li-Fi communication through the solid-state lighting module; and at least one open-loop phase that provides precision power modulation to extend the low power dimming resolution of the digital switch model controller.

The solid-state lighting module may comprise of one or more solid-state light emitting device(s) for illumination and/or wireless communication wherein each light emitting device is capable of emitting; coherent light and/or; incoherent light. The coherent light source may be a laser or the like, and may enable communication by modulation of the output.

Single or multiple light emitting packages may contain one or more light emitting elements capable of radiating a single colour which includes white, or a plurality of colours and optionally has a modulation bandwidth at −3 db greater than a few thousand Hertz. The light emitted by the light emitting elements may also include infra-red or ultraviolet light, and other non-visible wavelengths.

The power supply may contain control and filtering means to allow the input power source to be used as a means to transmit or receive information across a network for controlling and reporting the status of the solid state lighting system.

The microprocessor may contain one or more high resolution PWM outputs with a time resolution of less than 1 nS, and/or one or more high resolution analogue or digital conversion means for converting feedback sensor(s), and/or a means for securely communicating control and status information across one or more networks.

The system may also contain one or more of the following: Acoustic, sound or vibration sensor; chemical sensor; electrical, electric current, electrical potential, magnetic or radio sensor; a flow or fluid velocity sensor; a ionizing radiation or sub atomic particle sensor; navigational sensors; human centric user operated controller; position, angle, displacement, distance, speed and acceleration sensors; optical light, imaging and photon sensors; pressure sensors; force, density and level sensor; thermal, heat and temperature sensors; proximity and presence sensors; security sensors eg; fingerprint, iris, facial sensors; frequency sensor; other types of sensors; optical sensor detecting light intensity; optical sensor detecting colour or visible spectrum of light; video camera sensor; temperature sensor; smoke sensor; gas detection sensor; power sensor.

The fundamental switching frequency of the system may be between 20 KHz and 1 GHz, or between 20 KHz and 1 MHz.

The power control system may comprise: at least one AC to DC switch mode power supply; one or more output driver modules containing either a high modulation bandwidth voltage controlled current source or voltage clamp to modulate the current or power suitable for data transmission through the connected light emitting device(s); a means for ensuring the high modulation bandwidth data output is rejected or attenuated by the switch mode power supply to ensure stable current or power output is maintained; a means for providing internal and external control commands to the controller from or to a high bandwidth data control network.

The power conversion module may stably operate over a wide light emitting device current range especially at currents <1% of maximum output module current.

The power control system may be configured to dynamically and independently configure the duty cycle and fundamental switching frequency of the one or more switch mode regulators.

The power control system may be configured to provide linear or non-linear current or continuous or non-continuous power profiles over a quantised time interval to the light emitting device(s).

The voltage clamping or linear regulator arrangement may be capable of injecting high bandwidth current or voltage signals onto the output modules of the power convertor to provide a wireless photonic data transfer rate between 1 kbps and 100 Gbps through the connected light emitting device(s).

The output drive module(s) may be capable of delivering a current to one or more light emitting device(s) with a magnitude down to 1 nanoAmpere in a controlled manner.

The light output characteristic may be controlled by one or more of the following: an optical wireless signal transmitted or received from a remote transceiver; an RF or infra read wireless signal transmitted or received from a remote transceiver; a signal received over Ethernet.

The light emitting device may contain at least one high power (>0.1 W) solid-state light source.

The illumination system may contain at least one high bandwidth light sensitive device.

The output module may deliver power to one or more light emitting devices using pulsed, non-pulsed or analogue current profiles either exclusively or combined.

The current profile through the light emitting device is selected from Direct Current, Alternating Current, Pulse Width Modulation, Pulse Amplitude Modulation, Pulse Frequency Modulation, Pulse Density Modulation, Delta Sigma Modulation, Stochastic Signal Density Modulation (SSDM), and Amplitude Modulation.

A current source or current sink may be attached in parallel to the output. The current source or current sink may be controllable independent from the main output module.

An embodiment of the present invention includes a means for a power conversion module which includes controlling the power factor and the quality of power to the illumination system. The power factor of the switch mode power supply unit used within one embodiment of the illumination system may be ≥0.70, or ≥0.98, so that, once the power is delivered to the device load, the amount of current returned is minimised.

A power factor correction (PFC) circuit is optionally employed in the invention when used with AC signal in to DC signal out topologies to precisely control the input current on an instantaneous basis, to match the waveshape of the input voltage. The PFC circuit may contain active and/or passive power factor correction to ensure the illumination system has a power factor correction greater than 0.7.

The quality of power delivered to the illumination system can affect the overall lifetime characteristics of the system. For example, significant voltage spikes that occur from the power providers transmission lines could result in partial or catastrophic failure of the light emitting source (in the case of a direct AC LED) or the power control system (in the case of a DC LED system). Therefore in an embodiment of this invention a power line conditioner topology is utilised to improve the quality of the power that is delivered to the illumination system.

A further embodiment of the present invention utilises a light emitting device that contains at least one high power (>0.1 Watt) (O)LED or SSDL emitter package that may contain one or more light emitting elements. The (O)LED and/or SSDL emitter package may be of a type that can be energised using either a DC or AC voltage depending on user or system requirements. The (O)LED and/or SSDL emitter package(s) may be arranged into an ordered or pseudo-ordered array of light emitters in order to optimise the light exiting the illumination system.

A further embodiment of the present invention utilises a light emitting device that contains at least one coherent and/or incoherent light source.

The controller may able to utilize a microprocessor, programmable system on a chip (PSoC), FPGA (Field Programmable Gate Array), ASIC (Application Specific Integrated Circuit) or any other alternative integrated circuit device that is capable of computing information or data to calculate control parameters of the light emitting device(s). Furthermore, said controller is optionally able to utilize and implement feedback and feedforward control systems to rapidly react to information provided by feedback from a variety of condition sensors in order to modulate the characteristics of the light emitting device(s). Such feedback sensors could include but is not limited to optical, colour, light intensity, temperature, timer, occupancy, current, voltage, power, gas, magnetic, vibration, humidity, acceleration, velocity, frequency and biological means of monitoring or detecting environmental conditions.

The illumination system may incorporate light emitting device(s) comprising single or multiple light emitting packages containing one or more light emitting elements capable of radiating photons in a narrow wavelength band, or a wide wavelength including white, or a plurality of photons within the visible or non-visible electromagnetic spectrum.

The light emitting device(s) may comprise one or more (O)LED and/or SSDL strings. In at least one embodiment, the light emitting device comprises at least two (O)LED and/or SSDL strings comprising a string of (O)LEDs and/or SSDLs that emit a first wavelength spectrum within the visible range and a string of (O)LEDs and/or SSDLs that emit a second wavelength spectrum in the non-visible range.

According to a further aspect of the invention, there is provided a power source wherein said power source could be either or a combination of a high or low voltage AC or DC energy source. The AC power supply range may vary from a few volts of AC input to many thousands of volts of alternating current whilst the DC voltage input may vary from a few volts of direct current to many thousands of volts DC depending on the electrical and electronic configuration of the controller system.

The power source may be powered by a power supply or transformer that is optionally attached directly or remotely to the illumination system. The power source may be an AC to DC power supply, a DC to DC power supply, an AC to AC power supply or any other suitable power supply.

According to yet a further aspect of the invention, there is provided a single stage switch mode power supply wherein the said topologies provide safety, component value and temperature variation compensation methods including one or more of the following features: current limiting, foldback, thermal shutdown, safe area protection, over current, short circuit or output power protection.

According to another further aspect of the invention, there is provided a controller which converts an 8-bit user intensity control demand into a high resolution visually step free controlled output. A variant of the high resolution controller may allow the solid-state light sources to emulate a significantly slower output response rates similar to traditional light sources to reduce the appearance of steps when changes in intensities are seen. The present aspect of the invention may allow the change in output response over a defined time period.

The controller is optionally capable of measuring the output drive module current, voltage and power consumption in either a continuous conduction or non-continuous conduction mode using the advanced microprocessor or integrated circuit device and control sensor values. Utilizing a microprocessor to control or regulate the output drive module enables sophisticated control algorithms to be implemented in real-time.

According to a further aspect of the invention, there is provided a means for a switch mode regulator wherein the control circuit further comprises: an integrated circuit, microprocessor or any other similar semiconductor means to generate an analogue and/or pulsed switch control signal; a means for receiving light emitting device characteristics such as light intensity, power spectral density, light emitting device temperature; a means for receiving sensor information; and a means for transceiving information across a control network, sensor network, user interface and/or a communication system which incorporates the light emitting device for illumination and a high bandwidth light sensitive device.

In this aspect of the invention, it is possible to modulate the time-average current flowing through the light emitting device by modulating a high frequency signal on the current flowing through the light emitting device using either an analogue or pulsed dimming phases.

In this aspect of the invention, it is possible to measure the switching regulator output voltage and hence derive the forward voltage across the light emitting device connected to the power control system using a simple potential divider or emitter-follower topology connected to regulator output module. The emitter follower may be designed to use a simple transistor such as the BC846C with input and output bias resistors to appropriately set the gain of the emitter follower arrangement which can then be used to provide a voltage feedback value to the controller system.

According to a further aspect of the invention, the time average current flowing through the light emitting device can be suited to either/or a constant current or constant voltage type dimming control circuit topology.

According to a further aspect of the invention, there is provided a means for a controller wherein the light output characteristic of the illumination system can be controlled by one or more of: an optical wireless signal received from a remote transceiver; and an RF wireless signal received from a remote transceiver.

According to a further aspect of the invention, there is provided a means for a controller capable of measuring the output voltage of the attached light emitting device(s) wherein the output drive module(s) are delivering a controlled current to one or more light emitting device(s) such that damage to the light emitting device(s) can be limited.

According to a further aspect of the invention, there is provided a means for a controller system, wherein the output module can deliver power to one or more light emitting device(s) using pulsed, non-pulsed or analogue current profiles either exclusively or combined wherein the current profile (or power) through the light emitting device may be Direct Current, Alternating Current, Pulse Width Modulation, Pulse Amplitude Modulation, Pulse Frequency Modulation, Pulse Density Modulation, Delta Sigma Modulation, Stochastic Signal Density Modulation (SSDM), Amplitude Modulation or any other current control technique known to those in the art.

Using the various aspects of the invention, it is possible to provide current and hence power to one or more attached light emitting device(s) with a vastly extended dynamic dimming range enabling a wide range of different light emitting devices including single die emitter packages, single array packages containing multi die emitters or multiple packages to be powered using the same driver output stage(s).

The various aspects of the present invention are able to utilise the particular dimming method (phase) with the best efficiency according to the power demand and thus maximise the efficiency across the whole dimming current (or power) range. Switching regulators currently available offer high efficiencies (80%-99%) at maximum output power. However, as the output power is decreased down to zero, the switching mode regulator is not able to accurately and repeatedly provide an output current to the light emitting device(s) as the energy storage components within the switching device become discontinuous. This results in unstable current or power though the light emitting device(s) which results in an undesirable visual flickering of the light emitters and an unacceptably high minimum dim illumination level. The various aspect of the present invention are able to maintain stability of the switching regulator continuously even at very low output currents and/or powers by combining two or more dimming methods on an output module using a multi-phased based dimming approach.

A significant advantage of this multiphase dimming technique is at higher intensities there is no pulsing as the solid-state lighting sources are operated in a DC or analogue mode. When lighting systems are usually above 70% maximum intensity users are working in the environment and so the multiphase dimming offers a healthy non-pulse method.

Light emitting devices currently available may range from a few hundred milliwatts of power right up to a few hundred or thousands of watts depending on the configuration of the illumination system. Each of the light emitting devices within the illumination systems require different forward voltages and forward currents in order to operate correctly and the present invention enables the output drive module to be easily configured using a microprocessor (or similar device) making it more suitable to drive a greater range of illumination systems.

Combining the unique features of a switching regulator with an output driver module containing a controller such as a microprocessor or similar device that enables two or more dimming methods to be used across one or more dimming phases enables a very wide dynamic dimming (or power) ratio to be achieved and it is possible to have a 1 to 4294967296 ($2^{32}$ using 32 bits) range by combining two dimming methods each containing 16 bit dimming resolution $2^{16}$ or 65535 dimming steps. Although a $2^8$ bit or 256 dynamic range is fine for many lighting applications there is a growing requirement to provide small absolute current (power) steps for the first few control protocol intensity bits. Increased dimming (or power) resolution enables illumination systems to offer exponential dimming curves that are pleasing to the human eye and mimic the dimming effects seen by traditional light sources such as incandescent or halogen bulbs that have a much slower response time compared to Solid-state Light sources. The present invention enables linear or non-linear dimming of light emitting devices to very low illumination levels by translating an 8-bit control protocol dimming requirement into a higher bit resolution current/power output using appropriate time dependent methods and algorithms.

There are increasing health concerns over the use of some artificial lighting solutions especially those that exhibit significant pulsing characteristics such as high pulse modulation depths and low pulse frequencies. Increasingly, consumers require their artificial lighting solutions to be human centric by minimising the amount of light source flicker. The present invention seeks to reduce light source flicker effects by limiting pulsed dimming methods to low light emitting source(s) currents often only seen when illumination systems are in a transition phase between being switched on or off. In addition, the current invention will utilise output switching modules that offer high switching frequencies for example, greater than 30,000 Hz, and on pulsed dimming phases that utilise a pulsed current/power method suitably high pulse frequencies to ensure light intensity flicker is minimised.

A further advantage of the present invention is that it offers a low cost and simple means of incorporating a high frequency modulation scheme onto the output module of the controller enabling information in the form of data to be optically transmitted through the light emitting devices at high speeds. The present invention can be implemented simply in both single stage and multi-stage, isolated or non-isolated switching topologies with very little increase in component count or cost.

It will be appreciated that any features discussed above in relation to a particular aspect of the invention, may also be applied to any other aspect of the invention.

BRIEF DESCRIPTION OF THE DRAWINGS

Embodiments of the invention will now be described, by way of example only, with reference to the accompanying drawings, in which.

DETAILED DESCRIPTION

Figure 1:
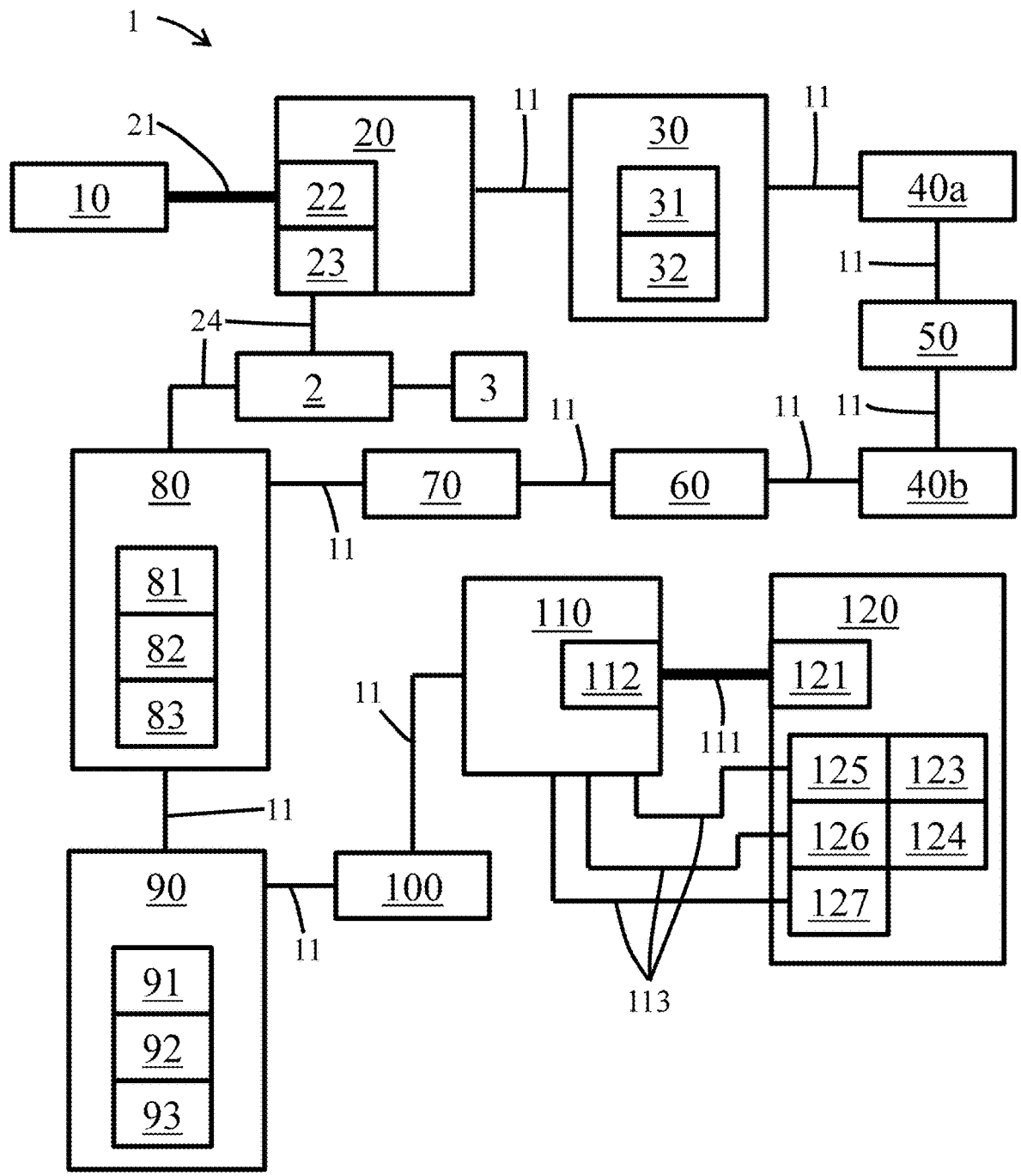
FIG. 1 illustrates a schematic diagram of an illumination system incorporating a control system according to an embodiment of the invention.

FIG. 1 schematically illustrates an illumination system 1 according to one embodiment of the present invention. The illumination system 1 of FIG. 1 is a high efficiency, low cost system with ultra-wide dimming ratio that is capable of having a load current dimming ratio of at least 15000:1 using DC or constant current reduction.

The illumination system 1 includes a power source 10, connected by a power cable 21 to a connector module 20, which in turn is connected to an excess voltage protection module 30 and an input noise filter module 40. The input noise filter module 40 filters power from the power source 10 prior to rectification and current limiting by a rectifier/limiter module 50. The rectifier/limiter module 50 is connected to a power factor correction module 60 followed by an isolation and power module 70 providing the required power to enable a dynamic control system 80 to manage operation of the illumination system 1. The dynamic control system 80 is connected to one or more output drive module(s) 90. In the example of FIG. 1, a single output driver module 90 is shown. Each output driver module 90 is connected to an output noise filter 100 which ensures that constant current with a minimum of noise is given to an output connector 110. The output connector 110 provides the power from the system 1 to a light emitting device fixture 120, via a cable 111.

The modules prior to the power module 70 form a high voltage input side of the circuit, whilst the later modules form an output side.

All of the modules 10, 20, 30, 40, 50, 60, 70, 80, 90, 100, 110, 120 mentioned above comprise components that are connected to each other via one or more dedicated printed circuit board (PCB) conducting tracks or cables 11. Each of the modules 10, 20, 30, 40, 50, 60, 70, 80, 90, 100, 110, 120 will be explained in more detail below.

The power source 10 of the illumination system 1 could be either a high voltage (>100V) or low voltage (<100V) AC power source. In one example, the power source may be mains power. The power source 10 is connected by a suitably rated power cable 21 to a first terminal block 22 of the connector module 20. The first terminal block 22 could be either panel mounted or PCB mounted. The first terminal block 22 may be a multiple pole type to enable multiple drivers to be linked simply together.

Depending on the configuration of the illumination system 1 other cables could be connected to the first terminal block 22 or a second terminal block 23 within the connector module 20. These cables may provide various sensor inputs or output as well as a communication bus 24 for communicating instructions between the illumination system 1 and a master controller 2. The communication bus 24 may be based on a variety of hardware or protocol systems such as I2C, SPI, UART, RS232, RS485, DMX CAN, USB, IEEE1394, DMX, RDM, KNX, DALI, 802.11b/n, Bluetooth, Zigbee, Ethernet readily available within digital communication systems The excess voltage protection module 30 may comprise of one or more fuses 31 in either or both power supply phase inputs to improve safety. The fuses 31 are included to protect against short circuits to earth on the respective phases, or a short circuit between phases.

The excess voltage protection module 30 may also optionally include excess voltage protection at the input that consists of transient protection. It is known that transient spikes from the power source module 10 can damage sensitive components. In one example, the transient voltage suppression is a transient voltage suppressor 32 which will efficiently protect the rest of the illumination system 1 from transient voltage spikes.

The input noise filter module 40 has two main functions. The first is, in compliance with international standards, to prevent inherently generated noise from the switching regulators within the switch mode power supply of the illumination system 1 from returning into the power source 10 particularly where the power source 10 is coupled to the mains network. The second function of the input filter module 40 is to stop noise from the power source 10, particularly where the power source 10 is coupled to the mains network, entering into the illumination system 1.

In at least some embodiments, the input filter module may contain sub-modules 40a,b on both the input and output of the rectifier/limiter module 50. For example, an input filter in the form of a capacitor, resistors and inductor may be provided to attenuate noise on the input of the rectifier module 50.

(O)LEDs are typically driven by direct current. The input side of the rectifier/limiter module 50 converts the AC power source 10 into rectified DC power. For example, a bridge rectifier or other suitable means may be used to convert the AC power to DC.

In some embodiments, the rectifier/limiter module 50 provides a soft-start feature by limiting the inrush current at the start-up phase. Limiting the current taken by the illumination system 1 in the start-up phase is useful for determining the safe value ratings for cables, fuses and other components.

The power factor of the circuit is the ratio of the real power absorbed by the load (in this case the light emitting device fixture 120), to the apparent power flowing in the circuit. Real power is the instantaneous product of voltage and current whilst apparent power is the product of average current and voltage.

The power factor correction (PFC) module 60 may include a controller that provides a power factor close to 1 and offers over temperature, over current and over power protection on the primary side of the switch mode power supply. For example, the controller may be a standard switched mode power supply integrated circuit controller.

The PFC module 60 reduces the inductive and capacitive load on the power source module 10. The PFC module 60 also provides a boost in the output voltage which enables many light emitting devices to be driven. In one embodiment, the PFC module 60 is driven by a start-up current derived from the output module of the rectifier/limiter module 50 and during normal operation is driven by an operating current which takes over once the PFC module 60 circuit has started up.

The isolation and power module 70 is connected to the output of the PFC module 60 and contains capacitors that are large enough to absorb and smooth out ripple currents exiting from the PFC module 60 whilst providing direct voltage to the dynamic control system 80 and output drive module 90.

One embodiment of the isolation and power module 70 would provide one or more regulated voltages to the control system 80 in order to optimise the efficiency of the switch mode power supply. A further embodiment may also provide a transformer. In either case, the isolation and power module 70 provides galvanic isolation of the output from the high voltage inputs.

The control module 80 is powered from the voltage supply outputs of the isolation and power module 70. One embodiment of the control system module 80 incorporates a microprocessor 81 executing software control algorithms, a means for communicating via a bus 24 with the network master controller 2, one or more user interfaces 82 and one or more sensor interfaces 83. In one example, the microprocessor may be a STM32F334 microprocessor from ST Microelectronics although any similar Integrated Circuit maybe used.

The user interface enables users to determine the output control functions of the illumination system 1. One embodiment of the user interface 82 would include a menu keypad and LCD display to. A further embodiment would be a web-based user interface on a portable or fixed computing device.

In addition, a network communications interface 3, coupled to the master controller 2, enables data and external controller commands to be passed between the outside world and the illumination system 1. Any suitable network connection may be used, including, but not limited to, internet, local area networks, WiFi, 4G, 5G, Lora, Bluetooth and the like.

The control module 80 can also provide modulation on the output intensity in order to provide transmission of data. A light sensitive device may also allow for reception of data. The transmission and reception of data will be discussed in more detail below.

The output drive module 90 includes a switch mode power supply (SMPS), also referred to as a switching regulator 91, arranged to control the current provided by the output drive module 90. A sensor 92 is also provided. The sensor 92 is arranged to detect various parameters of the output, as will be discussed below in more detail. A microcontroller 93 is also provided, for controlling operation of the switch regulator 91. In one example, the output driver stage 90 may be in the form of a Buck converter topology (formed by an LC tank) to convert the pulsed output from the SMPS microprocessor to a continuous output signal for the light emitting fixture 120.

The output drive module 90 is controlled by the control system 80, in turn under control of the master controller 2, to ensure a constant current, and delivers a voltage that is dependent on the number of light emitting devices used within the light emitting device fixture 120. An embodiment of the digital control module 80 incorporates the output drive module 90 into the control module 80 to reduce the cost and size whilst increasing efficiency.

The output noise filter module 100 includes an inductive and capacitive load which removes ripple and noise spikes in the output from the output drive module 90 and prevents or limits switching noise from leaking onto the output of the SMPS. Since the light emitting device fixture 120 require stable voltages in order not to be overloaded by high ripple voltages, the output noise filter 100 ensures the conducted and radiated noise emissions on or from the output cable 111 connected to the light emitting device fixture 120 are attenuated.

The output noise filter module 100 includes a filter which is implemented with the use of capacitors along with an inline inductor connected to the anode terminal of the light emitting diode. The implementation of the filter will be readily understood by a person skilled in the art.

The output cable and connector module 110 contains a terminal block 112 for the output cable 111. The output cable 111 provides power to the light emitting device fixture 120 and also one or more cables 113 to carry signals from sensors 125, 126, 127.

In one embodiment the light emitting device fixture 120 contains a wire or connector block 121 to receive power from the output cable 111 of the illumination system, a heatsink 123 that is thermally connected to a metal core PCB containing lighting emitting devices 124 or (O)LED array substrate, a temperature sensor 125 to measure the temperature of light emitting device 124, a light intensity sensor 126 to measure the intensity of the ambient light and the output of the light emitting device 124, a colour sensor 127 to measure the colour of the light emitting device 124.

As discussed above, the output side of the circuit shown in FIG. 1 is galvanomically isolated from the input side, which is high voltage. This isolation is achieved by a power transformer and opto-isolators.

Power is supplied to one or more parts of the illumination system 1 in the form of one or more input voltages in either a non-isolated or isolated manner. For example the controller 2 may require isolated power to ensure the illumination system 1 is isolated from any communication cables plugged into the system 1 that could have excess voltages applied due to incorrect wiring or being hit by lightning if it is routed outdoors.

The control module 80 is powered directly from the output of the isolation and power module 70 via a linear regulator which in this case is defined as an LM29150. The linear regulator could be replaced with a DC/DC switching regulator to improve efficiency of the power supply to the microprocessor 81 when the output voltage of the power stage is significantly larger than that of the microprocessor supply.

Other power requirements within the illumination system 1 may need different operating voltages compared to others such as the microcontroller unit (MCU) usually requiring 3V3 and the driver output module 90 requiring up to 65V.

In one example, the high voltage SMPS controller 93 is an ST Micro L6562D PFC and PWM power controller however any similar type of single- or multi-stage control topology may be used for this embodiment.

Power to an isolation transformer is controlled using a switching MOSFET which in-turn is controlled by the gate driver pin of the master network controller 2. The transformer forms part of an isolated flyback SMPS design in the isolation and power module 70. Feedback is provided from the secondary isolation side of the driver module 90 in order to control the SMPS power by using an opto-isolator however it is possible to use alternative methods of single- or multi-stage control which do not require opto-isolators. For example, the LinkSwitch-PH family from Power Intergrations Inc, USA offer highly integrated monolithic switching devices that can implement a single stage topology without the use of an opto-isolator and secondary side feedback components.

Figure 2:
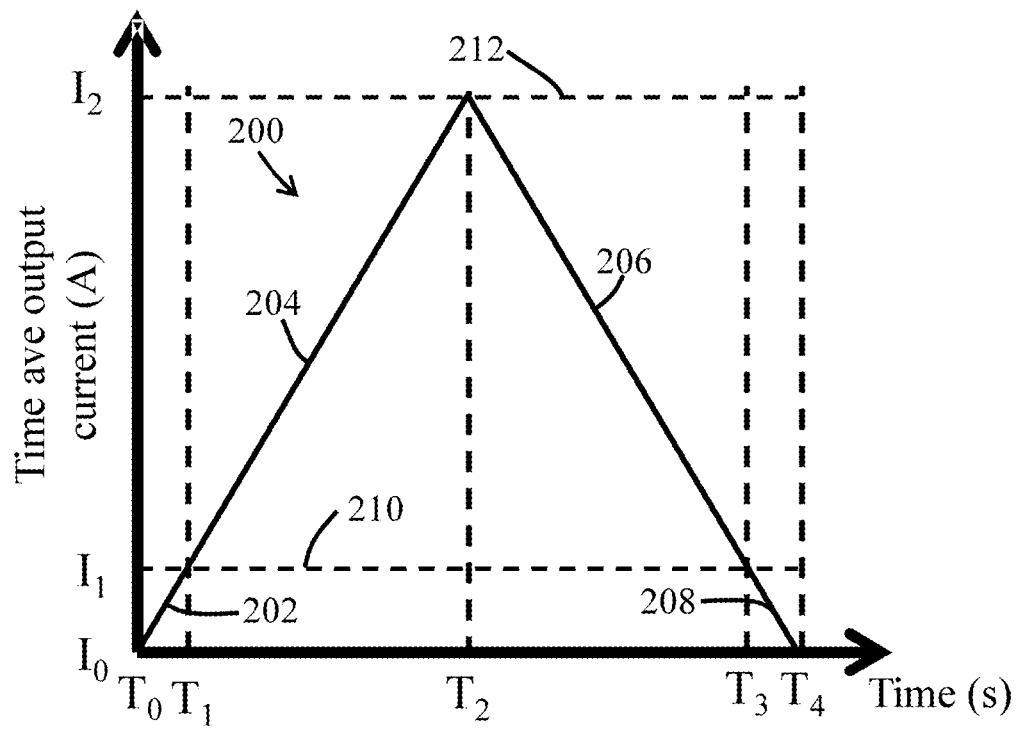
FIG. 2 schematically illustrates a dimming profile of the lighting system, as the output is varied from an off state, to an full on state, and back to the off state

FIG. 2 provides a graph that describes an illustrative dimming profile 200 often used within solid-state lighting applications whereby a solid state light fixture is required to be switched on gradually up to a maximum allowable intensity (or output current) then gradually dimmed down to an off state. The profile shows the time averaged output current provided through a single driver module 90 of the system discussed in relation to FIG. 1, although it will be appreciated that this time average current is proportional to the intensity of the light output from the LEDs 124.

As illustrated in FIG. 2, four distinct stages of dimming 202, 204, 206, 208 can be used to achieve the dimming profile 1 in a seamless manner whilst maximising the use of analogue dimming at higher light intensities to promote healthy (non-pulsed) lighting.

The first dimming 202 stage starts at $T_0$. In the first dimming stage 202 the output current is increased from an initial "off" level, Jo to a threshold intensity level $I_1$ 210 at time $T_1$. This is referred to as a pulsed dimming Stage 1.

In a second dimming stage 204, from time $T_1$ to time $T_2$, the output is increased from $I_1$ to a maximum level $I_2$ 212. The second stage 204 is referred to as analogue dimming stage 2.

In a third dimming stage 206, from time $T_2$ to time $T_3$, the output is decreased from 12 to $I_1$. The third stage 206 is referred to as analogue dimming stage 3.

In the fourth dimming stage 208, from time $T_3$ to time $T_4$, the output is decreased from $I_1$ to $I_0$. This is referred to as a pulsed dimming Stage 2.

As can be seen from FIG. 2 and the above discussion, the dimming stages 202, 204, 206, 208 are either pulsed dimming 202, 208 or analogue dimming 204, 206. With reference to FIG. 2, when the output is above the threshold level 210, the dimming is analogue, and when the output is below the threshold 210, the dimming is pulsed. Therefore, the output over the full range of I0 to I2 can be considered to be made up of two distinct dimming phases—pulsed dimming and analogue dimming. When the desired output intensity is below the threshold 210, pulsed dimming is used, and above the threshold, analogue dimming is used.

It is important to note that the output current is shown as time averaged so that the actual output current (and hence light fixture intensity) is comparable irrespective of the phase and the type of dimming used in each phase.

In the analogue dimming phase, the current from the driver module 90 is a constant current between $I_1$ and $I_2$, depending on the desired output intensity. Variation of the output intensity in the analogue dimming phase is provided by using DC dimming such that the output module 90 is always operating within a continuous conduction mode.

In the analogue dimming phase, the sensor 92 detects the current at the output. The sensed current is used in a PID feedback control loop by the micro-controller 91, to modify the current output from the SMPS 91 to the desired level. Therefore, the analogue dimming phase can be considered a closed loop control phase.

The sensor may also detect the voltage, and other variables of the power supply and light output to provide further control over the analogue dimming phase.

In the analogue dimming phase, the SMPS 91 in the Buck converter in the output driver stage 90 is operating in a continuous conduction mode, where the current through the inductor of the converter is never 0. The analogue dimming phase may reduce light output by reducing various parameters of the pulsed signal from the SMPS. This includes the switching frequency of the pulsed signal. At sufficiently low dimming level, the Buck converter would transition to discontinuous operation, which is inherently unstable. However, as this transition to discontinuous operation occurs the system 1 switches to the pulsed dimming phase.

In the pulsed dimming phase, the output of the SMPS is switched between periods in continuous operation (i.e. periods in an ON state) and periods in the OFF state. The periods in the ON state include one or more pulses, whilst the periods in the OFF state have no output at all. The switching frequency of the SMPS is controlled so that during the ON state, the Buck converter is operating in continuous mode.

The pulsed dimming phase is an open control loop phase, in that it does not make use of feedback from the current sensor. Instead, the micro-controller 91 controls the output driver module 90 and SMPS to provide the desired averaged current level based on known factors of the output power signal.

Figure 3:
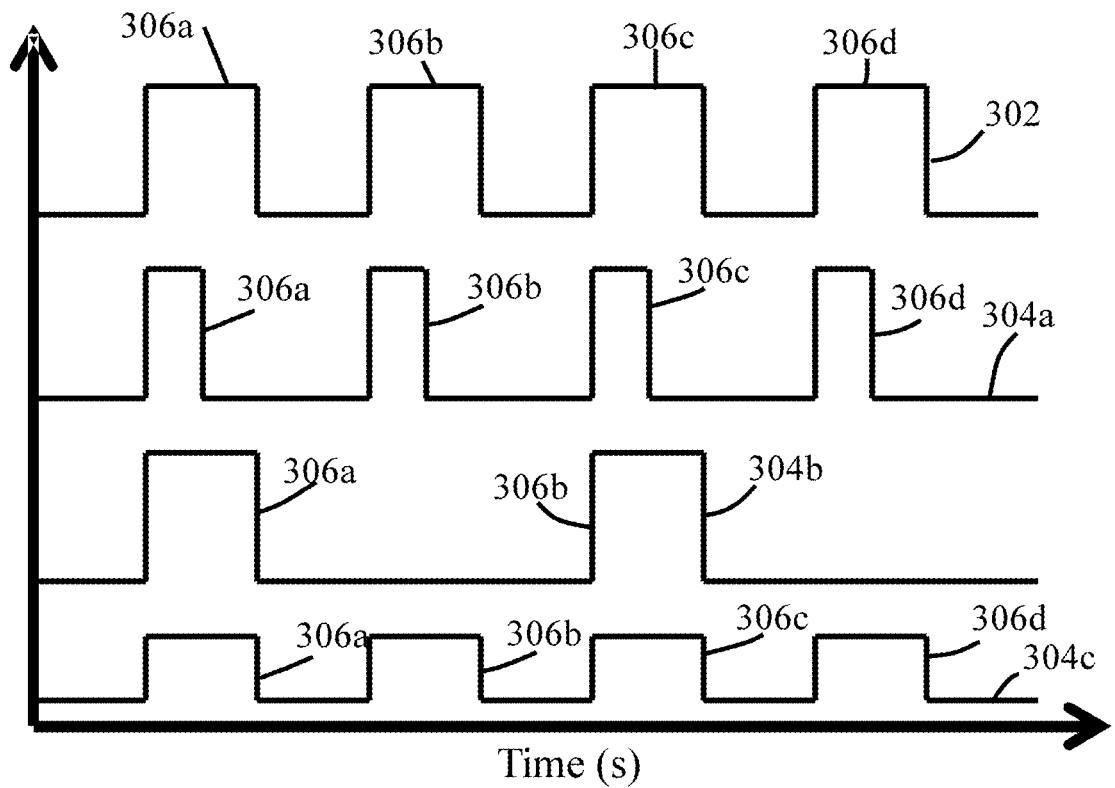
FIG. 3 illustrates examples of pulsed signals for providing low dimming range.

FIG. 3 illustrates an example of a first pulsed signal 302 for providing a first intensity level $I_x$ in the pulsed dimming phase. This includes a number of periods 306*a-d* when the SMPS 91 is in the ON state, separate by periods in the OFF state. Each ON state period 306 includes a number of pulses such that the Buck converter is operating in continuous conduction mode. The duration of the OFF state corresponds to at least one pulse.

FIG. 3 further illustrates three examples of signals 304*a-c* that can provide a second intensity level $I_{x/2}$ which is half that of the first intensity level.

In a first example 304*a*, the duration of each of the ON periods is halved. In the second example 304*b*, the duration of the ON periods is the same as the first example 302, but two of the ON periods are omitted. In a third example 304*c*, the intensity of the pulses in each ON period is halved. In each case, the time averaged current over a fixed period is equal to half that of the first intensity level $I_x$.

As can be seen from FIG. 3, assuming the frequency of the pulses in each signal 302, 304*a-c* is constant, then the intensity is halved by halving the number of pulses. Thus, in one embodiment, the micro-controller 91 may simply control the number of pulses emitted through the output driver module, for example by counting, to control the output to various dimming levels. No feedback from the current sensor is required.

In the signals shown in FIG. 3, the pattern of the ON periods is regular (i.e. periods of fixed duration spaced apart by a fixed duration OFF period). It will be appreciated that in other examples, the output may be a random pattern of ON and OFF periods, that may be repeated periodically.

Furthermore, in other embodiments, various one or more of the parameters of the pulses may be varied, provided continuous conduction operation is maintained for the ON period. For example, the switching frequency, pulse duration and amplitude of each pulse may be varied.

In at least some embodiments, the micro-controller 91 may access look-up tables in order to determine the desired output signal for a particular desired current. The micro-controller 91 may determine a desired output level, and retrieve the characteristics of the output signal required to achieve that intensity from the corresponding line of the lookup table. The lookup tables may be stored in a memory of the micro-controller 93, master controller 2, or may be accessible through the interface 3 or bus 24.

The dimming resolution of an illumination system 1 such as described above is the incremental increase (or decrease) in output intensity between adjacent dimming levels. In other words, the dimming resolution is the minimum change in intensity level that the system 1 may provide. A low resolution corresponds to large steps in output between levels, whilst a high resolution corresponds to small steps.

In typical dimming systems, the dimming resolution may be constant across the entire output intensity range. However, in the system 1 discussed above, the dimming resolution may vary between the two dimming phases.

For example, in the analogue dimming phase, the dimming resolution may be a first resolution, and in the pulsed dimming phase, the dimming resolution may be a second resolution. The second resolution may be lower than the first, such that the dimming varies by smaller increments in the analogue dimming phase. In other examples, the dimming resolution may be the same across both phases. In a further example the pulsed dimming may have a higher resolution than the analogue dimming phase.

It will be appreciated that although the analogue dimming phase may appear to have a continuously varying current, there will still be a minimum resolution defined by the incremental changes possible with the hardware implementing the dimming.

In the pulsed dimming phase, the resolution is limited by a number of factors including the minimum stable changes in the pulsed output characteristics, and the number of lines available in the look-up tables.

Over the output range of the pulsed dimming phase $I_0$ to $I_1$, the output current is split into a number of evenly spaced levels, defined by the resolution. The dimming may be N bit, where the range is split into $2^N$ steps.

The first limiting factor on the resolution of the dimming in the pulsed dimming phase is the size of the look-up tables. Each step of the dimming requires a separate line in the look-up table.

The further limiting factor on the resolution in the pulsed dimming phase is the pulse characteristics of the output pulsed signal. For example, there may be a minimum Ton and/or a minimum amplitude for the pulses in the signal which can be regularly repeated in a stable manner such that all pulses are provided to the output without being missed. The fundamental switching frequency ($f_{switch}$) of the pulsed signal may also limit the resolution.

In one example, where dimming in the pulsed dimming phase is achieved by varying the number of pulses per second, the number of pulses provided at an output level may be given by:

$$P = n \frac{f_{switch}}{R}$$

Where:
P is the number of pulses per second (split over one or more ON periods), which determines the output
n is the output intensity level, and
R is the number of different dimming steps in the pulsed dimming range.

For any given single stage switch regulator topology there is a defined minimum output stability level at which continuous conduction mode may be maintained. This is determined by the various component tolerances and minimum feedback errors associated with the switch regulator topology. Using only the analogue dimming phase, once the desired output current drops below the minimum stability level the switch regulator becomes unstable and the output current will fluctuate unpredictably resulting in visible flicker to the human eye which is highly undesirable. The threshold 210 for changing between the pulsed dimming phase and the analogue dimming phase is thus determined based on the lower limit at which continuous conduction mode can be maintained. The threshold may, for example, be selected to be just above this limit. The threshold 210 is chosen at the minimum level at which the noise on the current or voltage sensor is at an acceptable level to accurately provide feedback for the closed loop analogue dimming phase. Therefore, the pulsed dimming takes over when the sensor is no longer able to provide reliable feedback.

In at least some embodiments, an auto-correction may be applied when the output intensity is increased from a level below the threshold 210 to a level above the threshold 210. When the output is at or just below the threshold 210, but dimming has not switched to the analogue dimming control, the feedback from the sensor is measured. When a command is received to increase the output, the measured current across the output is compared to the threshold 210. A correction is then applied so that the analogue dimming phase increments the output from the measured current rather than the expected threshold. The new threshold is also stored for future use, rather than the previous threshold.

In other words, the auto-correction starts measuring the feedback before the control is switched to the closed control loop. The measured feedback is then used in the first iteration of the closed control loop.

During the analogue dimming phase, the output may be modulated to transmit data in the light. Data to be transmitted is received and encoded in modulations of the output voltage. This may be sensed by a corresponding detector and decoded accordingly. The lighting system 1 may further include a detector (not shown) to enable reception of data as well as transmission.

The current for the modulation of the output may be provided by a separate current source or current sink, that is controllable independently of the main output driver module 90. The switch regulator provides the majority of the power, whilst the current source or current sink provides the modulation. The current source or current sink may be connected in parallel to the output and may provide between 5% and 0% of the output power.

The high frequency output signal enables the light emitting diode load(s) connected to the output driver module(s) to vary the intensity proportionally to variations in the amplitude of the load current/power. Such optical variations can be easily picked up by receivers connected to or integrated with networked devices to transmit information.

Figure 4:
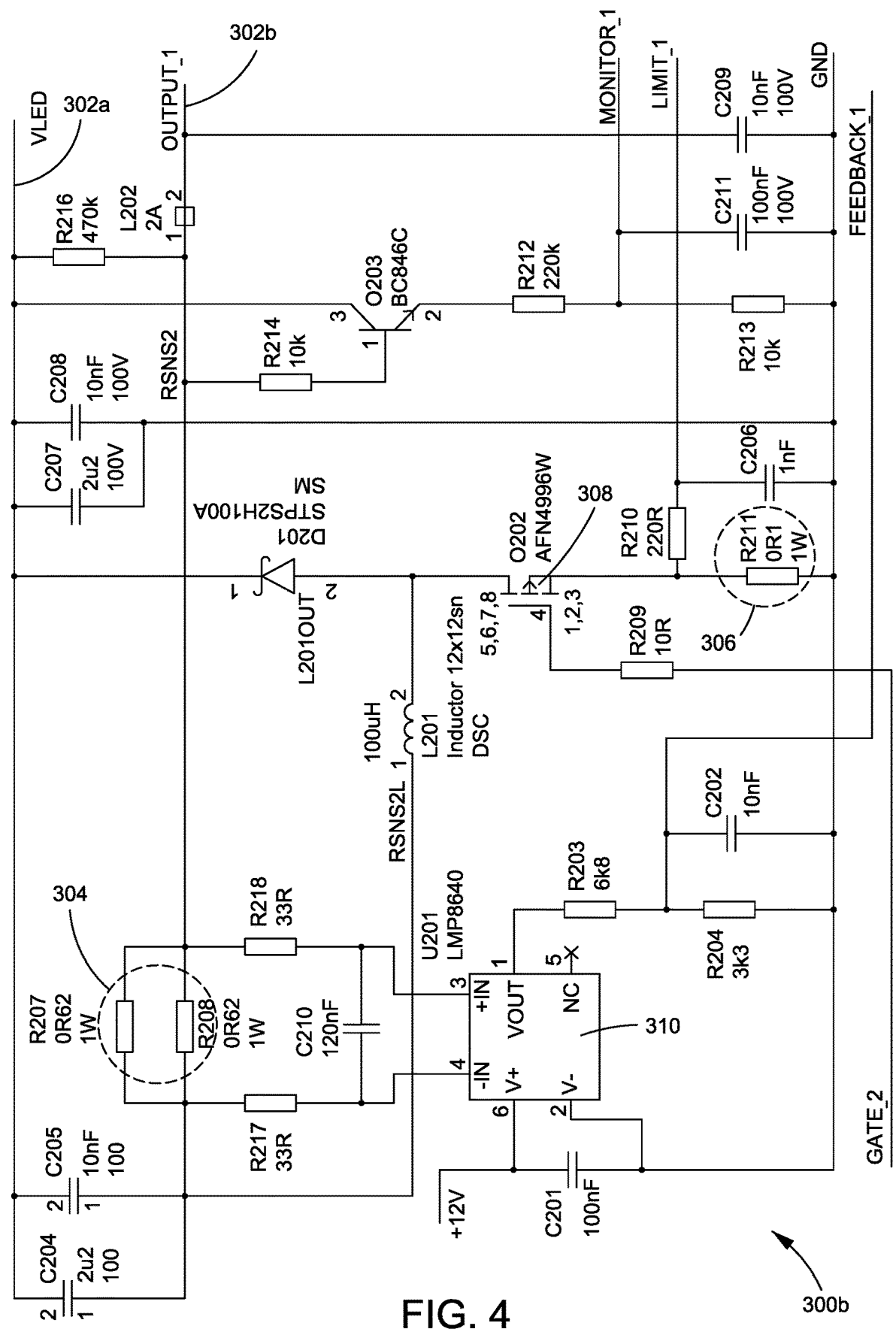
FIG. 4 illustrates a first example of a circuit for an output driver module of the system of FIG. 1, incorporating a control system according to an embodiment of the invention.

FIG. 4 illustrates on example of a circuit 300a of an output driver module 90 for the illumination system discussed above. In the example shown, the output driver module 90 is in the form of a Buck converter topology.

The LED fixture 120 is connected across the output 302a,b. The sensors 304 is provided as a current sense resistor and measures the current flowing the LED fixture 120. The sensor 304 is provided on the high side of the system to allow multiple output driver modules to be connected to the same system and still independently measure the current through each LED fixture. A short circuit sense resistor 306 is also provided in the circuit 300 that shuts down automatically the microprocessor signal GATE_2 when a specific voltage is reached across the sense resistor. The current sense monitor 310 provides current feedback to the microprocessor used for controlling the switching MOSFET 308. Fixing the ratio of the short circuit sense resistor 306 value and resistor R210 allows a hardware trip to occur when a trip current through the LED fixture 120 happens within nanoseconds and reduces any possible LED fixture 120 damage due to overcurrent The output driver module circuit 300 includes a switching MOSFET 308. The MOSFET controls the power and hence voltage and/or current on the output channels 302a,b. The MOSFET 308 is in turn controlled by a micro-controller. During the pulsed dimming phase, the micro-controller (not shown) controls operation of the MOSFET 308 via signal GATE_2 to open and close the channel through the MOSFET 308, and thus provide a pulsed output at the output channel 302a,b.

In the example discussed above, the output range of the system 1 is provided by two different dimming phases—a pulsed dimming phase and an analogue dimming phase. It will be appreciated that this is by way of example only. Any number of additional dimming phases may be provided in addition to the pulsed dimming and analogue dimming.

The system illustrated in FIG. 1 is given by way of example only. It will be appreciated that the various functions discussed may be omitted or may be provided in any suitable way without discrete modules. The discrete modules are disclosed for illustrative purposed only.

It will be appreciated that the profile of FIG. 2 is given by way of example only also, to illustrate certain embodiments of the invention. The true dimming profile of a system may include various points where the output is held constant for a period of time. The output need never by increased to the maximum, and may be switched on and off at any level, rather than increasing and decreasing from a minimum.

In the examples discussed above, one or more electronic parameters of the system (for example current, voltage, or power) are measured to control the dimming cycle. It will be appreciated that other parameters may be detected and used in the control of the dimming. For example, the system may also include sensors to detect one or more of: ambient lighting levels (in lux), colour sensors to detect the colour output from the LED fixtures 120, and occupancy (for example a passive infrared detector or microwave detector)

By detecting ambient lighting levels, the dimming output can be controlled so that the correct lighting can be achieved (for example in high ambient lighting levels, light output from the LEDs 124 can be reduced in low ambient lighting levels, light output from the LEDs 124 can be increased. By detecting colour, the output from different LEDs fixtures can be varied to achieve the desired lighting effect. By detecting occupancy, the dimming can be controlled so the lighting fixture 124 is only powered when needed. For example, if no occupancy is detected within a threshold time (for example 30 seconds), the light output can be reduced.

As with the dimming discussed above, these functions are now being built directly into the LED drivers, rather than using an external controller. Doing this offers a lower cost and localised/distributed control.

In variants of the current invention the time averaged output current could be derived for a constant voltage based output switching module.

The invention claimed is:

1. A control system arranged to provide dimming control of light output of one or more light emitting device, the control system comprising:
 a switch mode regulator arranged to provide an output power signal to the one or more light emitting device, and to vary the output power signal;
 one or more feedback sensors arranged to measure characteristic parameters of the output power signal, the characteristic parameters comprising at least one of: current, voltage and power; and
 a controller arranged to:
  when a characteristic parameter of the output power signal is above a threshold, vary the output power signal in a closed control loop, based on feedback from the one or more feedback sensors; and
  when the characteristic parameter of the output power signal is below the threshold, (i) vary the output power signal in an open control loop and (ii) the output power signal is a pulsed signal having a plurality of pulses and is alternated between one or more periods in an on state and one or more periods in an off state, wherein (a) at least some of the one or more periods in the on state including a plurality of pulses of the pulsed signal, and (b) at least some of the one or more periods in the off state having a duration corresponding to a plurality of pulses of the pulsed signal.

2. The control system of claim 1, wherein varying the output power signal in an open control loop comprises varying the ratio of a total time in the off state to a total time in the on state, to vary the total number of pulses in a fixed duration of time comprising one or more periods in the on state and one or more periods in the off state.

3. The control system of claim 1, wherein the durations of the one or more periods in the on state vary such that output signal follows an irregular pattern between the periods in the on state and the periods in the off state.

4. The control system of claim 3, wherein when the characteristic parameter of the output power signal is below the threshold, the output power signal is variable between a plurality of discrete levels, each level having a corresponding pattern of one or more periods in the on state and one or more periods in the off state.

5. The control system of claim 4, wherein the system comprises a memory arranged to store a look-up table to store the corresponding pattern for each discrete level of the output power signal.

6. The control system of claim 1, wherein the switch mode regulator is operated in a continuous conduction mode during the one or more periods in the on state.

7. The control system of claim 1, wherein a duration of each pulse of the pulsed signal is constant when the characteristic parameter of the output power signal is below the threshold.

8. The control system of claim 1, wherein the switch mode regulator comprises a switching device operated at a switching frequency and wherein when the characteristic parameter of the output power signal is above the threshold, varying the output power signal in a closed control loop comprises changing a switching frequency of the switch mode regulator to vary the pulse period.

9. The control system of claim 8, wherein the switch mode regulator is operable in continuous conduction mode when the switching frequency is above a minimum stable switching frequency.

10. The control system of claim 9, wherein the threshold of the characteristic parameter of the output power signal is determined such that the controller varies the output power signal in the closed control loop when the switching frequency is above the minimum stable switching frequency.

11. The control system of claim 1, wherein the controller is further arranged to: when the characteristic parameter of the output power signal is above the threshold, modulate the voltage or current of the output to provide for transmission of data by the light output.

12. The control system of claim 1, wherein the controller is further arranged to, on determining that the output power signal is to be increased from below the threshold to above the threshold:
 measure the characteristic parameter of the output power signal;
 compare the measured value to an expected value at the threshold, the expected value based on control data for controlling the system in an open control loop; and
 when determining that that the measured value is different to the expected value, control the switch mode regulator to increase the output power signal from the measured value, and modifying the control data based on the measured value.

13. The control system of claim 1, wherein the feedback sensor comprises a current sensing resistor provided in series with the output channel to the one or more light emitting device, wherein the current sensing resistor is floating with respect to a ground of the output channel.

14. A method of dimming lighting output, the method comprising:
 providing an output power signal for powering one or more light emitting devices;
 measuring characteristic parameters of the output power signal, the characteristic parameters comprising at least one of: current, voltage and power;
 when the characteristic parameter of the output power signal is above a threshold, varying the output power signal in a closed control loop, based on feedback from one or more feedback sensors; and
 when the characteristic parameter of the output power signal is below the threshold, (i) varying the output power signal in an open control loop and (ii) the output power signal is a pulsed signal having a plurality of pulses and is alternated between one or more periods in an on state and one or more periods in an off state, wherein (a) at least one of the one or more periods in the on state including a plurality of pulses of the pulsed signal, and (b) at least some of the one or more periods in the off state having a duration corresponding to a plurality of pulses of the pulsed signal.

15. The method of claim 14, wherein the output power signal is provided by a switch mode regulator.

16. The method of claim 15, wherein the method comprises:
 operating the switch mode regulator in a continuous conduction mode during the one or more periods in the on state, when the characteristic parameter of the output power signal is below the threshold and when varying the output power in the closed control loop.

17. The method of claim 15, wherein:
the switch mode regulator comprises a switching device operable in continuous conduction mode when the switching frequency is above a minimum stable switching frequency;
the threshold of the characteristic parameter of the output power signal is determined such that the output power signal is varied in the closed control loop when the switching frequency is above the minimum stable switching frequency.

18. The method of claim 14, further comprising employing a computer program and a computer to perform the method.

* * * * *